UNITED STATES PATENT OFFICE 2,582,985

EPOXIDE RESINS

Sylvan Owen Greenlee, Racine, Wis., assignor to Devoe & Raynolds Company, Inc., Louisville, Ky., a corporation of New York No Drawing. Application October 7, 1950, Serial No. 189,062

4 Claims. (Cl. 260—47)

This invention relates to new epoxide resins which are valuable for use in the manufacture of varnishes, molded products, adhesives, films, fibers, etc. The invention includes the epoxide resins and the method for their manufacture.

The new epoxide resins are made by reacting bisphenol (p,p' - dihydroxydiphenyldimethyl methane) with epichlorhydrin with the use of aqueous caustic alkali under regulated conditions to give complex reaction mixtures of monomeric polyethers of bisphenol and polymeric polyethers of bisphenol. In making the new epoxide resins the proportions of dihydric phenol and of epichlorhydrin are approximately two molecular proportions of epichlorhydrin for one molecular proportion of bisphenol, with the formation of complex reaction products which contain somewhat less than two proportions of epichlorhydrin reacted with the bisphenol, to give the complex mixture of monomeric and polymeric polyethers.

In making the new epoxide resins the reaction of the bisphenol and epichlorhydrin is advantageously carried out by adding at the outset the bisphenol and the epichlorhydrin, e. g., in the proportions of about 2 mols of epichlorhydrin to about 1 mol of bisphenol and with the use of caustic alkali in amounts sufficient to combine with the chlorine of the epichlorhydrin or somewhat in excess of that amount, advantageously with the addition of the caustic alkali at successive stages of the reaction.

The complex epoxide resins produced vary somewhat in their composition and properties, depending on the conditions of the reactions.

The primary reactions appear to be reactions in which the phenolic hydroxyls of the bisphenol react with the epichlorhydrin to give both monomeric and straight chain polymeric products such as illustrated by the following formulas or structures:

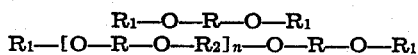

where R is the diphenyldimethyl methane residue of the bisphenol, $R_1$ is mainly an epoxide-containing residue and in minor part a hydroxyl-containing residue from the epichlorhydrin, $R_2$ is an intermediate hydroxyl-containing residue of the epichlorhydrin and $n$ represents the extent of the polymerization, e. g., 1, etc. in the admixed polymeric products formed.

In general the proportion of terminal epoxide residues or groups in the complex reaction mixture or resin is in considerable excess of the terminal hydroxyl-containing residues so that the reaction products are largely diepoxides, e. g., diglycidyl ethers of bisphenol.

The new epoxide resins have a melting point or softening point of around 43° C., varying somewhat with the conditions of reaction, e. g., between 40° C. and 47° C.; and epoxide equivalents, as hereinafter defined, between about 300 and 385.

The new epoxide resins are valuable raw materials for use in the manufacture of varnishes, molding compositions, etc. They are capable of polymerization in the presence of a catalyst to give high melting and even final infusible products.

The presence of terminal epoxide groups and to some extent of terminal primary hydroxyl groups enables the complex resins to react or polymerize by direct addition-reaction of epoxy and hydroxyl groups to form ether linkages in the presence of a suitable polymerization catalyst.

In making the new epoxide resins the bisphenol and the epichlorhydrin are advantageously added at the outset in the proportions of about 2 mols of epichlorhydrin to 1 mol of bisphenol with the addition of the caustic alkali either at the outset or in successive amounts and with a total amount of caustic alkali equal to or somewhat in excess of 2 mols. Thus, in reacting bisphenol with epichlorhydrin 2 mols of epichlorhydrin and one mol of bisphenol are advantageously added at the outset, e. g., by dissolving the bisphenol in aqueous caustic soda and adding the epichlorhydrin thereto and with regulation of the temperature and the addition of successive amounts of alkali in case all of the alkali is not added at the outset to give products of the desired degree of reaction.

The new epoxide resins are valuable products for use in making varnishes or coating compositions which after polymerization with a suitable catalyst give hard, inert film. Similarly, by using the initial condensation products in making molding compositions with subsequent heating and polymerization, particularly with a catalyst, valuable final molded compositions or products can be obtained. The products are also well adapted for treatment by esterification, e. g., with unsaturated higher fatty acids such as linseed oil acids or dehydrated castor oil acids, to make drying oils, etc. or by esterification with lower fatty acids to give plasticizers.

The new epoxide resins can also advantageously be used for reaction with additional dihydric phenol to produce higher melting point compositions. In this case the resins are freed from byproduct salt and excess caustic and then further reacted with an additional amount of dihydric phenol. When the additional amount of polyhydric phenol is less than that corresponding to the epoxy content of the resin the heating of the mixture will effect the union of the added polyhydric phenol with part of the epoxy groups to give a product of higher melting point and which needs no purification since no byproducts are formed in this further reaction. When less than the equivalent amount of polyhydric phenol is added to the epoxide resin the further reaction product will still contain the reactive epoxy groups. This further reaction of the epoxide resins with additional bisphenol or other dihydric phenol may produce higher melting point epoxide resins or may give infusible final reaction products. In this further reaction of the resins with dihydric phenols it may be advantageous or desirable to add small amounts of catalysts such as sodium hydroxide or sodium acetate to catalyze the further reaction to produce the higher melting point products or the final infusible products, but these catalytic substances are used in such small quantities that they are not detrimental to the product for most of its use so that their removal by washing or other methods is unnecessary.

When the epoxide resins are further reacted with polyhydric phenol the epoxy equivalent of the resin is determined as hereinafter described and an amount of the polyhydric phenol is added which is less than, equivalent to, or in excess of the epoxy content. Where less than the equivalent amount of polyhydric phenol is used only part of the epoxide groups of the initial product are utilized in forming the further polymeric product and giving a product still containing epoxide groups capable of further reaction, e. g., by polymerization with the addition of a polymerization catalyst or a cross-linking reactant.

The nature and advantages of the invention will be further illustrated by the following specific examples but it will be understood that the invention is not limited thereto. The parts are by weight.

*Example 1.*—798 parts of bisphenol were dissolved in a caustic soda solution made by dissolving 200 parts of caustic soda in 1730 parts of water in a stainless steel kettle, and 650 parts of epichlorhydrin were added to the closed kettle. The kettle was provided with a stirrer and the mixture was stirred during the process. The temperature rose from around 37° C. to around 70° C. in about 45 minutes. 80 parts of caustic soda in 200 parts of water were then added with further increase in temperature to about 82° C. in about one-half hour. 29 parts of caustic soda in 100 parts of water were then added and the kettle was heated to raise the temperature gradually to about 95° C. in about one hour. The aqueous liquor was then drawn off and hot wash water applied with agitation, and a series of four washing treatments with fresh water was applied until the product became neutral to litmus. The product was then dried by heating to a final temperature of 130° C., and drawn from the kettle.

In the above example 2 mols of epichlorhydrin are used for 1 mol of bisphenol with an amount of caustic soda somewhat in excess of 2 mols. The softening point of the resulting resinous product determined by Durran's Mercury method was 43° C. The approximate molecular weight determined by a standard boiling point elevation method was about 451. The determination of the epoxide groups in the product showed an equivalent weight of 325 per epoxide group which would represent approximately 1.39 epoxy groups per molecule of the average molecular weight indicated, and an equivalent weight to esterification of 84.5. The epoxide group content of the product was determined for practical purposes by determining the equivalent weight of the composition per epoxide group. The method used for determining the epoxide content was by heating one gram sample of the epoxide composition with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1N sodium hydroxide using phenolphthalein as indicator, and considering that 1 HCl is equivalent to one epoxide group.

The equivalent weight to esterification was determined by heating the product with about twice the theoretical amount of linseed oil acids necessary to react with all of the hydroxyl and epoxy groups at 228° C. until a constant acid value was obtained and by back titrating the unreacted linseed acids and calculating the hydroxyl plus epoxy content from such acid values, one epoxide group being equivalent to two hydroxyl groups in this test. In view of the possibility or probability that some polymerization takes place during this high temperature esterification the results can only be considered an approximation of the total hydroxyl plus epoxy groups esterified.

While the product is a homogeneous product, it is a composite product made up of monomeric and polymeric epoxide ethers of bisphenol. By fractional extraction with normal heptane a liquid fraction is obtained, leaving a higher melting point resin. By fractional distillation at 1 micron pressure and between 160° C. and 300° C. approximately half the material distilled and a large part of this distillate was liquid and apparently made up largely of diglycide ether of bisphenol with some hydrolyzed epoxide and some polymeric product. Fractions were thus obtained having an epoxide equivalent of 183 to 185 and fractions having somewhat higher epoxide equivalents up to around 300. The residual resin had a melting point of about 62.5° C. and an epoxide equivalent of about 525. In referring to average molecular weight based on a standard boiling point elevation method, accordingly, and epoxide groups per molecule based on the average molecular weight, these figures do not represent a homogeneous, uniform product but a mixture of monomeric and polymeric liquid and solid resins including diepoxides and polymeric and hydrolyzed products.

*Example 2.*—912 parts of bisphenol were dissolved in aqueous alkali containing 330 parts of sodium hydroxide in 2500 parts of water in an apparatus provided with a stirrer and reflux condenser. 740 parts of epichlorhydrin were added while the solution was at a temperature of 60° C. and cooling was applied to maintain the temperature around 60 to 80° C. for a period of about one and one-quarter hours. After decanting the aqueous liquid the product was repeatedly washed with water and dried in a vacuo. The resin was somewhat harder than that of Example 1, having a softening point of about 44° C., and on analysis for epoxide content showing an equivalent weight per epoxide group of about 340.

The utilization of the resins of the above examples for further reaction with dihydric phenols, to form higher melting point epoxide resins or infusible products is illustrated by the following examples.

*Example 3.*—The resin of Example 1 was further reacted by adding 57 parts of bisphenol and 0.055 part of sodium hydroxide to 325 parts of resin, corresponding to an equivalent of about 0.5 phenolic hydroxyls per epoxide group, sufficient to react with only about one-half of the epoxide groups of the resin, and this mixture was heated for 90 minutes at 150° C. and gave a product having a softening point of 74° C. and an equivalent weight to epoxide of 532.

*Example 4.*—The resin of Example 1 was further reacted by adding 114 parts of bisphenol to 325 parts of resin without the addition of sodium hydroxide, the amount of bisphenol being approximately equivalent to the epoxy content of the resin, and this mixture was heated for 90 minutes at 150° C. and gave a higher melting point resin having a softening point of 106° C. and an equivalent weight to epoxide of 1506.

*Example 5.*—The resin of Example 1 was further reacted by adding 42 parts of phloroglucinol to 325 parts of resin, corresponding to an equivalent of about one phenolic hydroxyl per epoxide group, and this mixture was heated for 90 minutes at 200° C. and gave an infusible product.

The utilization of the epoxide resin by itself with a catalyst for forming infusible products is illustrated by the following example:

*Example 6.*—The resin of Example 1 was melted and treated with 5% of its weight of sodium phenoxide. This mixture was heated for 30 minutes at 150° C. to give a hard, tough, infusible product.

Similarly a 50% solution of the resin of Example 1 in methyl ethyl ketone was treated with 5% of the weight of resin used of sodium phenoxide. This solution was used to form thin films of —.003 inch thickness which converted to hard, infusible films on heating for 30 minutes at 150° C.

The utilization of the new epoxide resins in making higher melting point reaction products by further reaction with dihydric phenols is further described and claimed in my companion application Serial No. 250,951.

The hardening or polymerization of the epoxide resins can be effected by the use of small amounts of suitable catalysts, particularly small amounts of alkali phenoxides. Boron trifluoride is an extremely active catalyst. The use of a polyhydric phenol, particularly in the form of the phenoxide, is particularly advantageous as a catalyst because in addition to its catalytic effect in promoting the reaction it can itself act as a polyfunctional coupling agent for uniting epoxy groups to form more complex polymeric products.

The epoxide resins are soluble in a wide variety of solvents including benzol and toluol as well as solvents such as acetone, methyl ethyl ketone diacetone alcohol, cyclohexanone, etc.

Solutions of high resin content can readily be made, e. g., up to 50% or more of resin in the solution. Such solutions, with the addition of a suitable catalyst, e. g., 5% on the weight of the resin of sodium phenoxide or monopotassium bisphenoxide can be used for making films which on heating, e. g., to 150° C. or 200° C. give hardened products which may be infusible films. Solutions of the new resins can be used in making clear and pigmented varnishes, in making transparent films and filaments, and in impregnating and laminating and coating wood, fabrics and other porous or fibrous materials, etc. When a small amount of a suitable catalyst is added to the solution the resulting film or coating on heating may be converted into an infusible, insoluble product.

Molding compositions can be made by adding a catalyst to the resin, molding the resulting mixture, and heating to effect hardening by polymerization without the formation of byproducts. It is one of the characteristics of the new resins that on final polymerization or reaction they tend to expand on hardening to give hardened products such as molded products with a somewhat lower specific gravity than before the polymerization takes place, differing in this respect from molding compositions and resins which contract upon hardening. This lack of contraction or slight expansion in the mold on hardening is valuable for many applications, enabling tight fitting molded articles to be obtained. For example, brushes of many types are made by using a heat-converting resin to cement the bristles into the brush ferrule. If the resin contracts during heat conversion the molded article tends to become loose-fitting in the ferrule. The new epoxide resins give a tight-fitting mold within the brush ferrule. Similarly molded inserts can be made which are tight-fitting when the composition has been molded in place.

The new epoxide resins can be reacted with compounds containing active hydrogen such as amines, and particularly polyamines, amides, mercaptans, polyhydric alcohols, polyimines, etc. to give a wide variety of valuable reaction products. Thus, difunctional reactants or polyfunctional reactants may serve to cross-link different molecules through reaction with terminal epoxide groups, and in some cases through terminal or intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The nature of the cross-linked product produced will depend on the type and amount of cross-linking reagent used and the conditions under which the reaction is conducted and fusible or infusible products can be obtained.

The new epoxide resins can be reacted with various polyfunctional cross-linking reactants such as amines, diisocyanates, e. g., methylene, bis(4 phenyl) isocyanate, dialdehydes, e. g., glyoxal, dimercaptans, amides, polyamides, e. g., urea, etc.

The new epoxide resins when further reacted or polymerized to form final infusible polymerization and reaction products give products having a remarkable combination of desirable properties, including resistance to water, solvents, alkalies, and acids, toughness combined with hardness, flexibility at low temperatures, ability to withstand high temperatures with little or no discoloration, resistance to chemicals, wettability to most pigments, low viscosity at high solids content of solutions, and hardening of thick films through chemical reactions within the film itself when a suitable catalyst or cross-linking reactant is used so that paint and varnish coatings far beyond the usual thickness can be applied. Such properties make the new compositions and products made therefrom valuable for many practical purposes.

This application is a continuation in part of my prior application Serial No. 621,856, filed October 11, 1945, allowed April 11, 1950 and now abandoned.

I claim:

1. The method of making an epoxide resin which comprises initially admixing approximately 2 molecular proportions of epichlorhydrin and 1 molecular proportion of p,p'-dihydroxydiphenyldimethyl methane and heating such mixture with the addition of an amount of dilute caustic alkali sufficient to combine with the chlorine of the epichlorhydrin, and continuing said heating for a sufficient time to effect substantially complete reaction of the p,p'-dihydroxydiphenyldimethyl methane to produce a resinous product having a softening point of about 43° C.

2. The method according to claim 1 in which at least part of the dilute caustic alkali is present in the initial mixture to convert the p,p'-dihydroxydiphenyldimethyl methane into its alkali salt.

3. The process according to claim 1 in which the dilute caustic alkali is added in installments, partly to dissolve the p,p'-dihydroxydiphenyldimethyl methane at the outset and partly in subsequent successive installments.

4. An epoxide resin prepared in accordance with the method set forth in claim 1.

SYLVAN OWEN GREENLEE.

REFERENCES CITED

The following references are of record in the file of this patent:

UNITED STATES PATENTS

| Number | Name | Date |
|---|---|---|
| 2,060,715 | Arvin | Nov. 10, 1936 |
| 2,324,483 | Castan | July 20, 1943 |
| 2,467,171 | Werner et al. | Apr. 12, 1949 |
| 2,500,765 | Montague | Mar. 14, 1950 |
| 2,528,932 | Wiles et al. | Nov. 7, 1950 |

OTHER REFERENCES

Journal Chem. Society 1932 pp. 1965–72.